United States Patent
Lee

(10) Patent No.: US 7,671,908 B2
(45) Date of Patent: Mar. 2, 2010

(54) OFFSET CORRECTION DURING CORRELATED DOUBLE SAMPLING IN CMOS IMAGE SENSOR

(75) Inventor: Kwang-Hyun Lee, Seongnam-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 11/595,612

(22) Filed: Nov. 10, 2006

(65) Prior Publication Data

US 2007/0182838 A1 Aug. 9, 2007

(30) Foreign Application Priority Data

Feb. 3, 2006 (KR) ...................... 10-2006-0010870

(51) Int. Cl.
*H04N 5/217* (2006.01)
(52) U.S. Cl. ....................................................... 348/241
(58) Field of Classification Search .................. 348/241
See application file for complete search history.

(56) References Cited

U.S. PATENT DOCUMENTS

| 6,400,301 | B1 * | 6/2002 | Kulhalli et al. | 341/155 |
| 6,587,143 | B1 * | 7/2003 | Boisvert | 348/241 |
| 7,268,814 | B1 * | 9/2007 | Pain et al. | 348/294 |
| 2004/0196392 | A1 * | 10/2004 | Yahagi et al. | 348/241 |
| 2005/0199813 | A1 * | 9/2005 | Van Bogget | 250/338.1 |

OTHER PUBLICATIONS

Japanese Patent Application No. 10-057294 to Toshio with title "CCD Signal Processing Circuit" published on Sep. 24, 1999 (w/ English Abstract page).
Korean Patent Application No. 1020030064377 to Lee et al. with title "CMOS Image Sensor for Obtaining a High Signal to Noise Ratio" published on Mar. 24, 2005 (w/ English Abstract page).
Japanese Patent Application No. 09-253040 to Xiaole with title "Low-Noise and Low-Power CMOS Correlation Type Double Sampler" published on Apr. 13, 1999 (w/ English Abstract page).
Japanese Patent Application No. 10-316683 to Yoshitoku with title "Image Sensor" published on May 30, 2000 (w/ English Abstract page).
Japanese Patent Application No. 2002-280534 to Takeshi with title "CMOS Image Sensor" published on Apr. 15, 2004 (w/ English Abstract page).

* cited by examiner

*Primary Examiner*—James M Hannett
(74) *Attorney, Agent, or Firm*—Monica H. Choi

(57) ABSTRACT

For correlated double sampling in an image sensor, a comparator receives and compares a reset signal and a sensing signal from a pixel of the image sensor. Also, a controller adjusts a voltage at a controlled input of the comparator to compensate for offset of the comparator from feed-back of an output of the comparator. The controller includes at least one charging current source and at least one discharging current source that are controlled to adjust such a voltage.

18 Claims, 12 Drawing Sheets

OFFSET CORRECTION DURING CORRELATED DOUBLE SAMPLING IN CMOS IMAGE SENSOR

This application claims priority under 35 U.S.C. § 119 to Korean Patent Application No. 2006-10870, filed on Feb. 3, 2006 in the Korean Intellectual Property Office, the disclosure of which is incorporated herein in its entirety by reference.

BACKGROUND OF THE INVENTION

1. Field of the Invention

The present invention relates generally to CMOS (complementary metal oxide semiconductor) image sensors, and more particularly, to offset correction of a comparator using current control during correlated double sampling for reduced area of the CMOS image sensor.

2. Background of the Invention

CMOS image sensors are recently in wide use with increase of demand for portable cameras. As is well known, CMOS image sensors have higher degree of integration and consume less power than a charge coupled device (CCD). Thus, CMOS image sensors are increasingly used in mobile phones, light digital cameras, etc.

FIG. 1 is a schematic diagram of a conventional CMOS image sensor. Referring to FIG. 1, the conventional CMOS image sensor includes a pixel array 10 having a matrix of a plurality of pixels with each pixel including a single photo diode and four transistors, a row decoder 11 driving rows of the pixel array 10, a CDS (correlated doubling sampling)/analog-to-digital conversion (ADC) unit 12 for columns of the pixel array 10, and a memory unit 13 for storing digitized pixel signals.

The CMOS image sensor of FIG. 1 sequentially outputs rows of image signals from the pixel array 10. Meanwhile, to reduce reset noise and fixed pattern noise occurring in each pixel, CDS is performed by the CDS/ADC unit 12 that also performs ADC.

FIG. 2 illustrates a first conventional CDS/ADC unit. Referring to FIG. 2, the first conventional CDS/ADC unit includes switches 20a and 20b for selectively coupling signals from a pixel to inputs of a comparator 22. In addition, the first conventional CDS/ADC unit includes a first capacitor 21b for storing a reset voltage switched by a switch 20b from the pixel during a reset sampling period, and includes a second capacitor 21a for storing a sensing voltage switched by a switch 20a from the pixel during a signal sampling period.

The comparator 22 has a negative input coupled to one end of the first capacitor 21b and the first switch 20b and has a positive input coupled to one end of the second capacitor 21 and the second switch 20a. A decreasing ramp voltage RAMP– is applied to the other end of the first capacitor 21b, and an increasing ramp voltage RAMP+ is applied to the other end of the second capacitor 21a.

With such ramp voltages applied, the comparator 22 generates an output that makes a logical transition at a time point that is dependent on a difference between the reset voltage and the sensing voltage from the pixel. A memory/latch unit 23 stores a gray code that has been sequentially changing with time at such a time point. The stored gray code is the digital value representing the difference between the reset voltage and the sensing voltage from the pixel. Such a difference between the reset voltage and the sensing voltage represents the intensity of light received at the photo-diode without a pixel offset.

A respective conventional CDS/ADC of FIG. 2 is used for each column of the pixel array. However, a respective offset for each comparator 22 of the columns may be different between the columns resulting in inaccurate and non-uniform CDS and ADC across the columns.

FIG. 3 illustrates a second conventional CDS/ADC unit that compensates for comparator offset. Referring to FIG. 3, the second conventional CDS/ADC unit includes switches 30a and 30b for selectively coupling signals from a pixel to inputs of a comparator 32. In addition, the second conventional CDS/ADC unit includes a first capacitor 31b for storing a reset voltage transferred from the pixel through a switch 30b and includes a second capacitor 31a for storing a sensing voltage transferred from the pixel through a switch 30a.

The first comparator 32 has a positive input coupled to the second capacitor 31a and the switch 30a and has a negative input coupled to the first capacitor 31b and the switch 30b. The outputs from the first comparator 32 are coupled to inputs of a second comparator 35 via third and fourth capacitors 33a and 33b that correct an offset of the first comparator 32.

Switches 34a and 34b apply an intermediate voltage (e.g., VDD/2) on the third and fourth capacitors 33a and 33b, respectively, when turned on. The second comparator 35 performs offset-corrected CDS. A memory/latch unit 36 stores a gray code at a time point when the output of the second comparator 35 makes a logical transition while the ramp voltages RAMP+ and RAMP– are applied after the reset signal and the sensing signal are applied on the capacitors 31b and 31a.

The second conventional CDS/ADC unit uses the additional capacitors 33a and 33b to store the offset of the first comparator 32. To correct for such an offset, the switches 30a and 30b are simultaneously closed when the reset signal is applied to both inputs of the first comparator 32. In this situation, the first comparator 32 has a positive output voltage and a negative output voltage at its two outputs from its own offset. To correct such an offset, the switch 34a is closed such that the offset of the first comparator 32 is stored in the fourth capacitor 33b.

Unfortunately, an amplification gain of the first comparator 32 cannot be increased in the second conventional CDS/ADC unit of FIG. 3. In detail, when an amplification gain is large, an output of the first comparator 32 is easily saturated even through a difference between inputs of the first comparator 32 is small, and even a small offset cannot be corrected.

When a voltage gain increases, the operating speed of the first comparator 32 is reduced. However, the influence of an offset of the second comparator 35 is reduced as much as the voltage gain of the first comparator 32. Thus, a small gain of the first comparator 32 is disadvantageous.

To overcome this problem, the first comparator 32 having a small voltage gain is used and then an offset correction circuit, which is provided after the first comparator 32 as described above, may be implemented again after the second comparator 35. However, in this case, circuit area and manufacturing price are disadvantageously increased with higher number of components.

SUMMARY OF THE INVENTION

In one aspect of the present invention, an apparatus for correlated double sampling in an image sensor includes a comparator and a controller. The comparator receives and compares a reset signal and a sensing signal from a pixel of the image sensor. The controller adjusts a voltage at a controlled input of the comparator to compensate for offset of the comparator from feed-back of an output of the comparator.

In an example embodiment of the present invention, the controller includes first and second current sources. The first current source is turned on for charging the controlled input of the comparator when the output of the comparator is at a first voltage, and the second current source is turned on for discharging the controlled input of the comparator when the output of the comparator is at a second voltage. The first and second current sources are turned off or balanced when the output of the comparator is at an intermediate voltage between the first and second voltages.

In a further embodiment of the present invention, the first current source is comprised of at least one PMOSFET coupled between a high power voltage and the controlled input, and being controlled with the output of the comparator and at least one PMOSFET control signal. The second current source is comprised of at least one NMOSFET (N-channel metal oxide semiconductor field effect transistor) coupled between a low power voltage and the controlled input, and being controlled with the output of the comparator and at least one NMOSFET control signal.

In an example embodiment of the present invention, the first current source is comprised of a plurality of PMOSFETs having a cascode configuration, and the second current source is comprised of a plurality of NMOSFETs having a cascode configuration.

In another example embodiment of the present invention, the first current source is comprised of a plurality of PMOSFETs having a differential configuration, and the second current source is comprised of a plurality of NMOSFETs having a differential configuration.

The apparatus for the correlated double sampling in a further embodiment of the present invention includes a first capacitor coupled to the controlled input of the comparator and includes a second capacitor coupled to another input of the comparator. In that case, the controller adjusts the voltage at the controlled input to compensate the offset of the comparator after the reset signal is stored in the first and second capacitors.

The apparatus for the correlated double sampling in another embodiment of the present invention includes a switching network for switching the sensing signal to be stored in the second capacitor, after the voltage at the controlled input is adjusted to compensate for the offset of the comparator. In addition, a first ramp signal is applied to the first capacitor, and a second ramp signal is applied to the second capacitor, after the sensing signal is stored in the second capacitor. Furthermore, a data storage device stores a bit code at a time point when the output of the comparator makes a logical transition as the first and second ramp signals are being applied.

In another example embodiment of the present invention, the controller includes a plurality of first current sources and a plurality of second current sources. The first current sources are turned on for charging the controlled input of the comparator when the output of the comparator is at a first voltage. The second current sources are turned on for discharging the controlled input of the comparator when the output of the comparator is at a second voltage. The first and second current sources may provide different charging and discharging current levels during different time periods.

The present invention may be used to particular advantage for analog to digital conversion with correlated double sampling in a CMOS (complementary metal oxide semiconductor) image sensor.

In this manner, an additional comparator is not used for correcting the offset of the comparator performing CDS in the image sensor. Rather current sources comprised of transistors are used for correcting the offset of the comparator performing CDS in the image sensor. Thus, the image sensor may be implemented with small area and low cost.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, 11, and 12 refer to elements having similar structure and/or function.

DETAILED DESCRIPTION OF THE INVENTION

Figure 1:
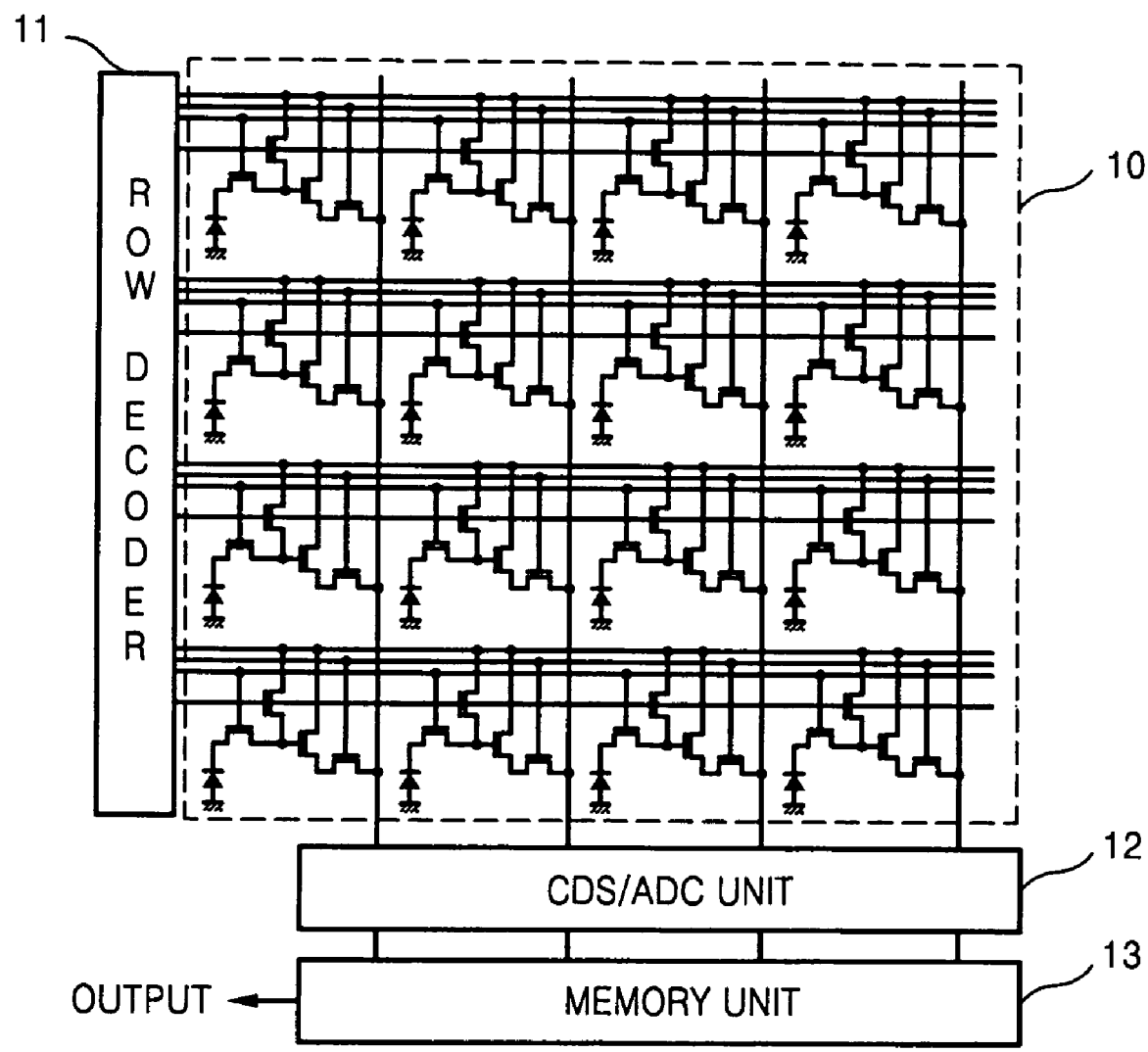
FIG. 1 is a schematic diagram of a conventional CMOS image sensor.
Figure 2:
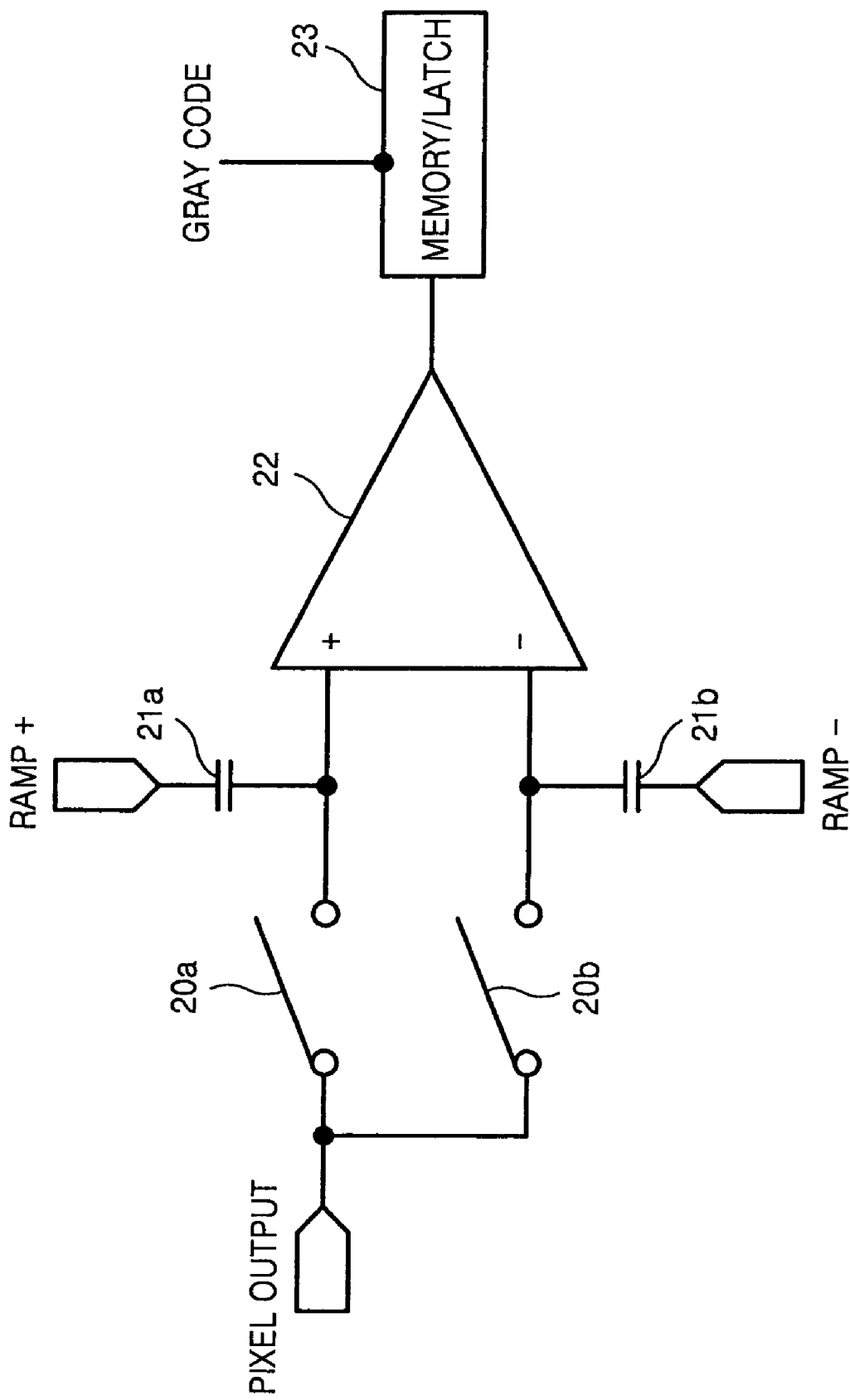
FIG. 2 illustrates a first conventional correlated double sampling (CDS)/analog-to-digital conversion (ADC) unit of a CMOS image sensor.
Figure 3:
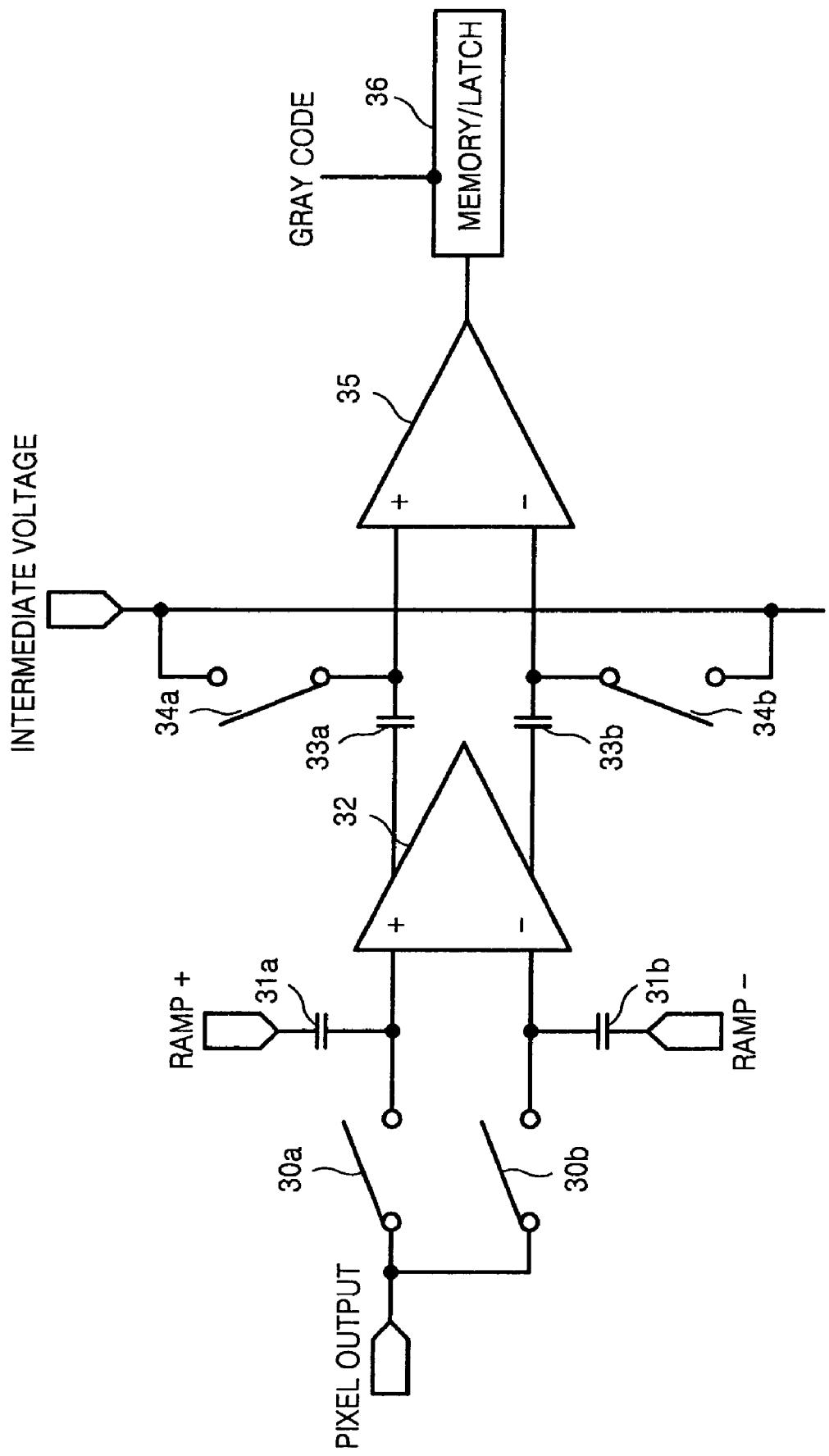
FIG. 3 illustrates a second conventional CDS/ADC unit of a CMOS image sensor.
Figure 4:
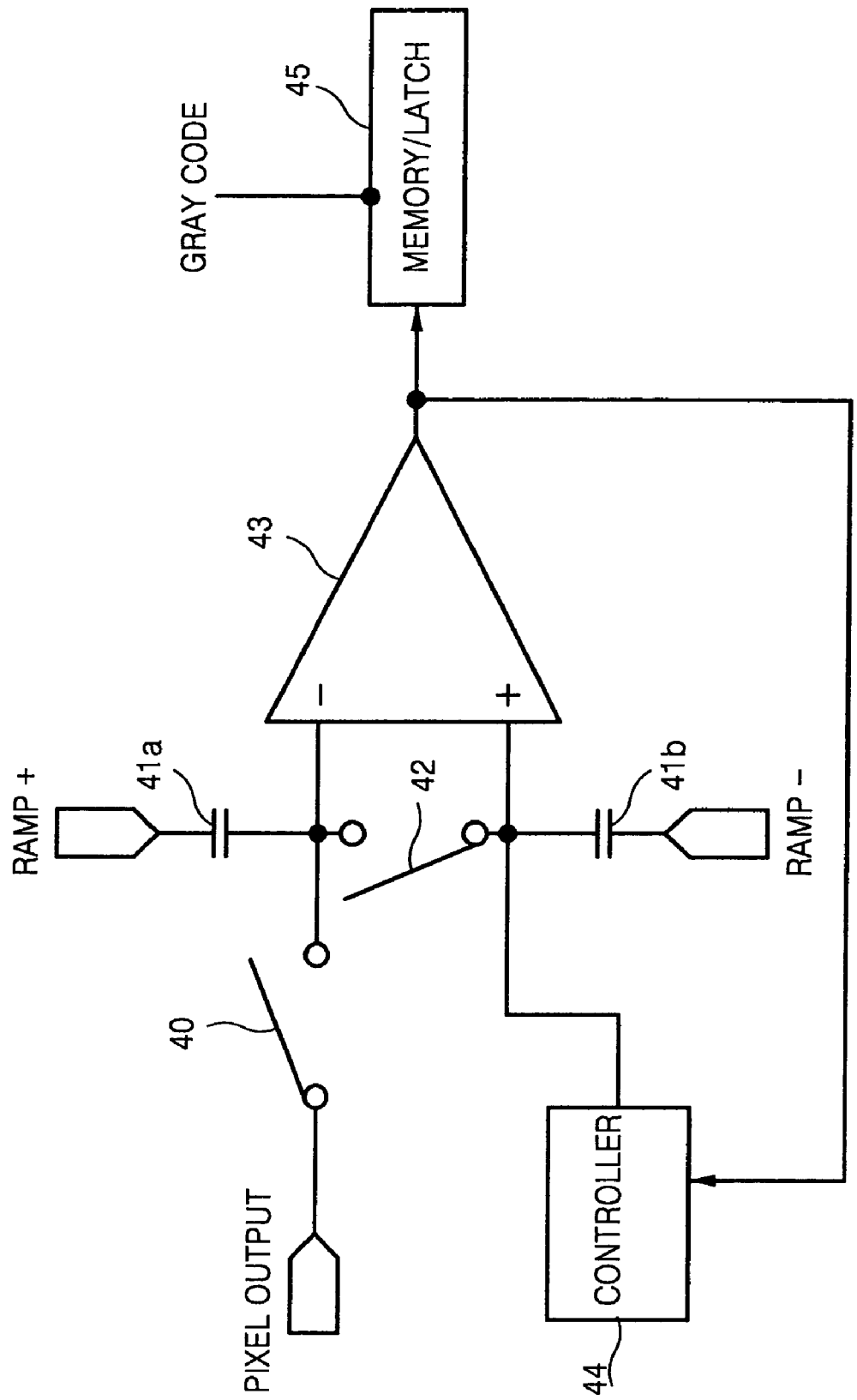
FIG. 4 illustrates a CDS/ADC apparatus of a CMOS image sensor according to an embodiment of the present invention.

FIG. 4 illustrates an apparatus for correlated double sampling (CDS)/analog-to-digital conversion (ADC) within a CMOS image sensor according to an embodiment of the present invention. Referring to FIG. 4, the CDS/ADC apparatus includes a comparator 43, a first capacitor 41a, a second capacitor 41b, a first switch 40, a second switch 42, a controller 44, and a memory/latch unit 45.

The comparator 43 sequentially receives a reset voltage and a sensing voltage from a pixel at a positive (+) input terminal and a negative (−) input terminal. The first capacitor 41a has a first end coupled to the negative (−) input of the comparator 43 and has a second end having a positive ramp voltage RAMP+ applied thereon. The second capacitor 41b has a first end coupled to the positive (+) input of the comparator 43 and has a second end having a negative ramp voltage RAMP− applied thereon.

The first switch 40 is coupled between the first end of the first capacitor 41a and an output terminal of a pixel of the image sensor. The second switch 42 is coupled between the first end of the first capacitor 41a and the first end of the second capacitor 41b. The controller 44 receives an output of the comparator 43 through a feedback loop and adjusts a voltage at a controlled input (i.e., the positive (+) input in the example of FIG. 4) of the comparator 43 to adaptively correct an offset of the comparator 43.

The memory/latch unit 45 is an example data storage device that receives a gray code GRAY that changes with time such as by being incremented with time. The memory/latch unit 45 stores the GRAY code at a time point when the output of the comparator 43 makes a logical transition after the reset and sensing signals are coupled to the capacitors 41a and 41b and after the ramp signals RAMP+ and RAMP− are applied.

Figure 5:
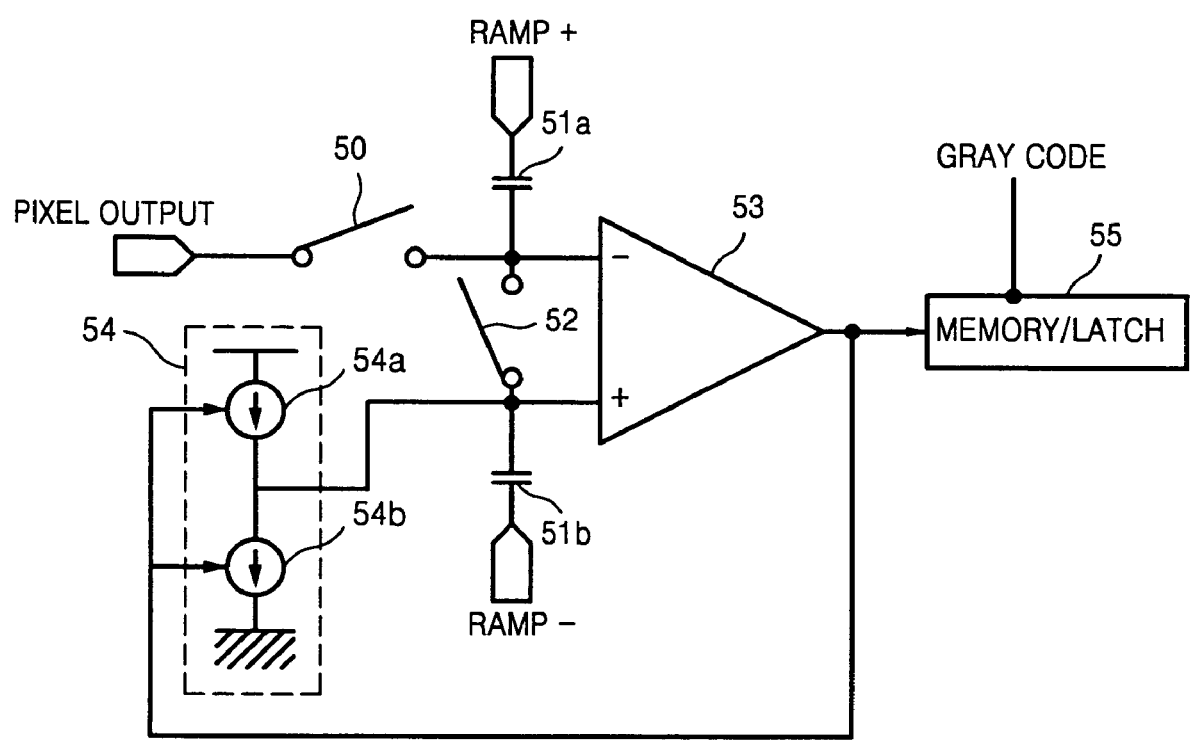
FIG. 5 illustrates a CDS/ADC apparatus of a CMOS image sensor according to another embodiment of the present invention.

In one embodiment of the present invention, the controller 44 includes current sources for adjusting the voltage at the controlled input of the comparator 43, as illustrated in FIG. 5. Elements 50, 51a, 51b, 52, 53, and 55 in FIG. 5 operate similarly as elements 40, 41a, 41b, 42, 43, and 45, respectively, in FIG. 4 as already described. The example controller 54 in FIG. 5 is implemented with a first current source 54a and a second current source 54b.

The first current source 54a when activated provides a charging current to the controlled input of the comparator 53, and the second current source 54b when activated provides a discharging current to the controlled input of the comparator 53. The first and second current sources 54a and 54b are activated depending on the logical state of the output of the comparator 53.

For example, when the output of the comparator 53 is at a logical low state (i.e., a first voltage), just the first current source 54a is turned on for charging up the controlled input (i.e., the positive (+) input) of the comparator 53. When the output of the comparator 53 is at a logical high state (i.e., a second voltage), just the second current source 54b is turned on for discharging the controlled input (i.e., the positive (+) input) of the comparator 53. Such charging/discharging operation is adaptively performed until the output of the comparator 53 reaches an intermediate voltage between the high and low logic levels when the offset of the comparator 53 has been corrected.

A reset signal (i.e., a reset voltage) of the pixel is stored into the first and second capacitors 51a and 51b with the switches 50 and 52 being closed. Thereafter, when the switch 50 is opened, the output of the comparator 53 has a logical high or low state from the offset of the comparator 53. In this situation, the first and second current sources 54a and 54b are controlled by such output of the comparator 53 for adjusting the voltage at the controlled input of the comparator until the output of the comparator 53 reaches the intermediate voltage level.

Figure 6:
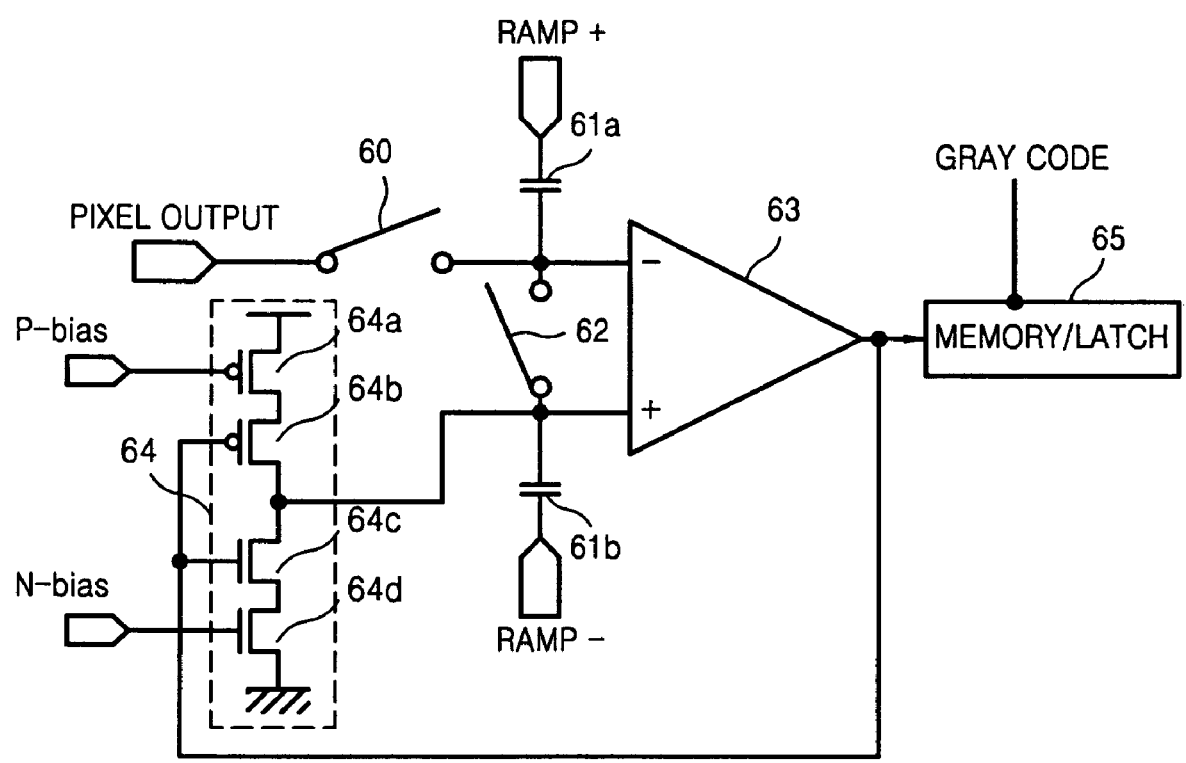
FIG. 6 illustrates a CDS/ADC apparatus of a CMOS image sensor according to still another embodiment of the present invention.

FIG. 6 illustrates a CDS/ADC apparatus of a CMOS image sensor according to still another embodiment of the present invention. Elements 60, 61a, 61b, 62, 63, and 65 in FIG. 6 operate similarly as elements 40, 41a, 41b, 42, 43, and 45, respectively, in FIG. 4 as already described. However, the controller 64 in FIG. 6 includes current sources implemented with MOSFETs (metal oxide semiconductor field effect transistors).

Referring to FIG. 6, the first current source for charging the controlled node of the comparator 63 is implemented with a first PMOSFET (P-channel MOSFET) 64a and a second PMOSFET 64b having a cascode configuration. The PMOSFETs 64a and 64b are coupled in series between a high power voltage and the controlled input of the comparator 63. The second current source for discharging the controlled node of the comparator 63 is implemented with a first NMOSFET (N-channel MOSFET) 64c and a second NMOSFET 64d having a cascode configuration. The NMOSFETs 64c and 64d are coupled in series between a low power voltage and the controlled input of the comparator 63.

The gate of the first PMOSFET 64a is controlled by a first (PMOSFET) control signal (i.e., a P bias), and the gate of the second PMOSFET 64b is controlled by the output of the comparator 63. The gate of the first NMOSFET 64c is controlled by the output of the comparator 63, and the gate of the second NMOSFET 64d is controlled by a second (NMOSFET) control signal (i.e., an N bias). In addition, each of switches 60 and 62 may be implemented with a respective MOSFET.

The operation of the CDS/ADC unit of FIG. 6 is now described in detail. When the output of the comparator 63 and the second control signal (i.e.; the N bias) are "logic high", the NMOSFETs 64c and 64d are turned on, and the PMOSFETs 64a and 64b are turned off. Accordingly, the voltage at the controlled positive (+) input of the comparator 63 is decreased.

In contrast, when the output of the comparator 63 and the first control signal (i.e., the P bias) are "logic low", the PMOSFETs 64a and 64b are turned on, and the NMOSFETs 64c and 64d are turned off. Accordingly, the voltage at the controlled positive (+) input of the comparator 63 is increased.

A reset signal (i.e., a reset voltage) of the pixel is stored into the first and second capacitors 61a and 61b with the switches 60 and 62 being closed. Thereafter, when the switch 60 is opened, the output of the comparator 63 has a logic high or low state from the offset of the comparator 63. In this situation, the PMOSFETs 64a and 64b or the NMOSFETs 64c and 64d are turned on according to the output state of the comparator 63 until the output of the comparator 63 reaches the intermediate voltage. At that point, the charging current source implemented with the PMOSFETs 64a and 64b and the discharging current source implemented with the NMOSFETs 64c and 64d are balanced.

In the balanced state, a correction voltage including the offset of the comparator 63 is stored in the capacitor 61b. Thereafter, the first and second control signals (i.e., P bias and N bias) turn off the current sources implemented with the MOSFETs 64a, 64b, 64c, and 64d, and offset correction is completed.

Thereafter, a signal voltage corresponding to the amount of light incident on the pixel is output from the pixel. The switch 60 is closed for a predetermined period of time (while the switch 62 is opened) such that a voltage level corresponding to a sensing signal is stored in the first capacitor 61a.

After the reset voltage sampling, the offset correction, and the signal voltage sampling, as described above, ramp voltages (i.e., RAMP+ and RAMP−) are applied to the second end of the capacitors 61a and 61b, respectively. With such ramp voltages RAMP+ and RAMP− being applied, the output of the comparator 63 makes a logical transition at a time point corresponding to the difference between the signal voltage and the reset voltage. The memory/latch 65 stores the gray code received at such a time point. The gray code is a digitized bit code that represents the difference between the signal voltage and the reset voltage for the ADC operation.

Figure 7:
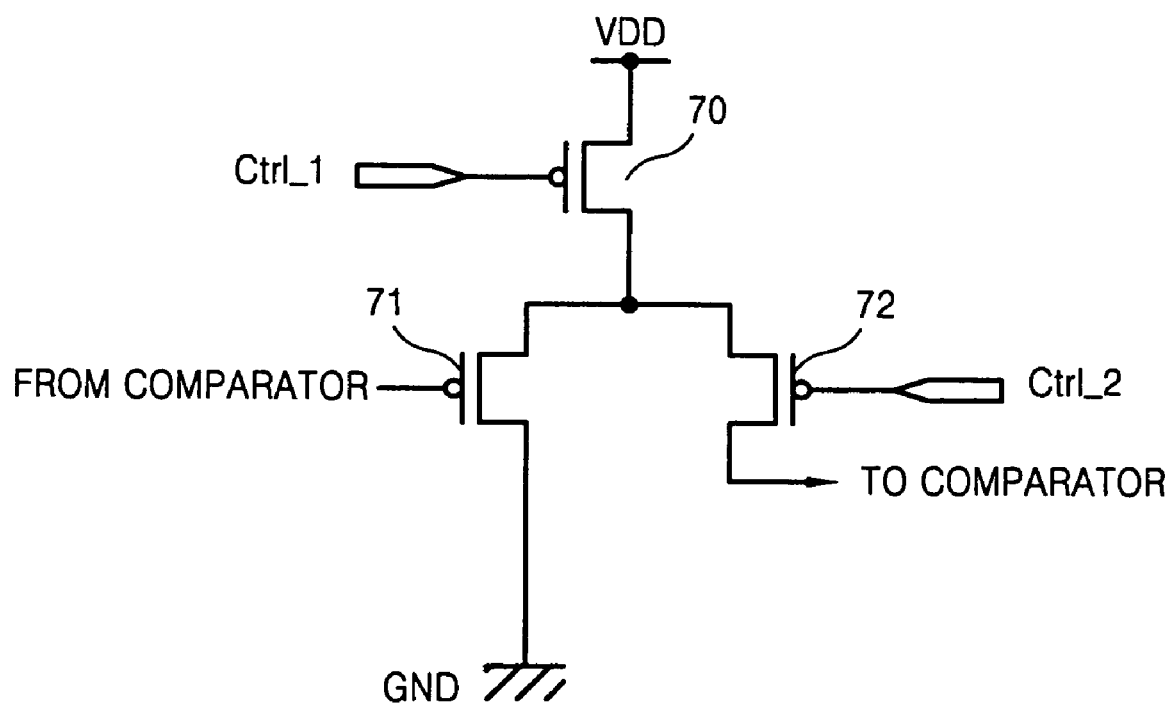
FIG. 7 is a circuit diagram of a current source including PMOS transistors according to an embodiment of the present invention.
Figure 8:
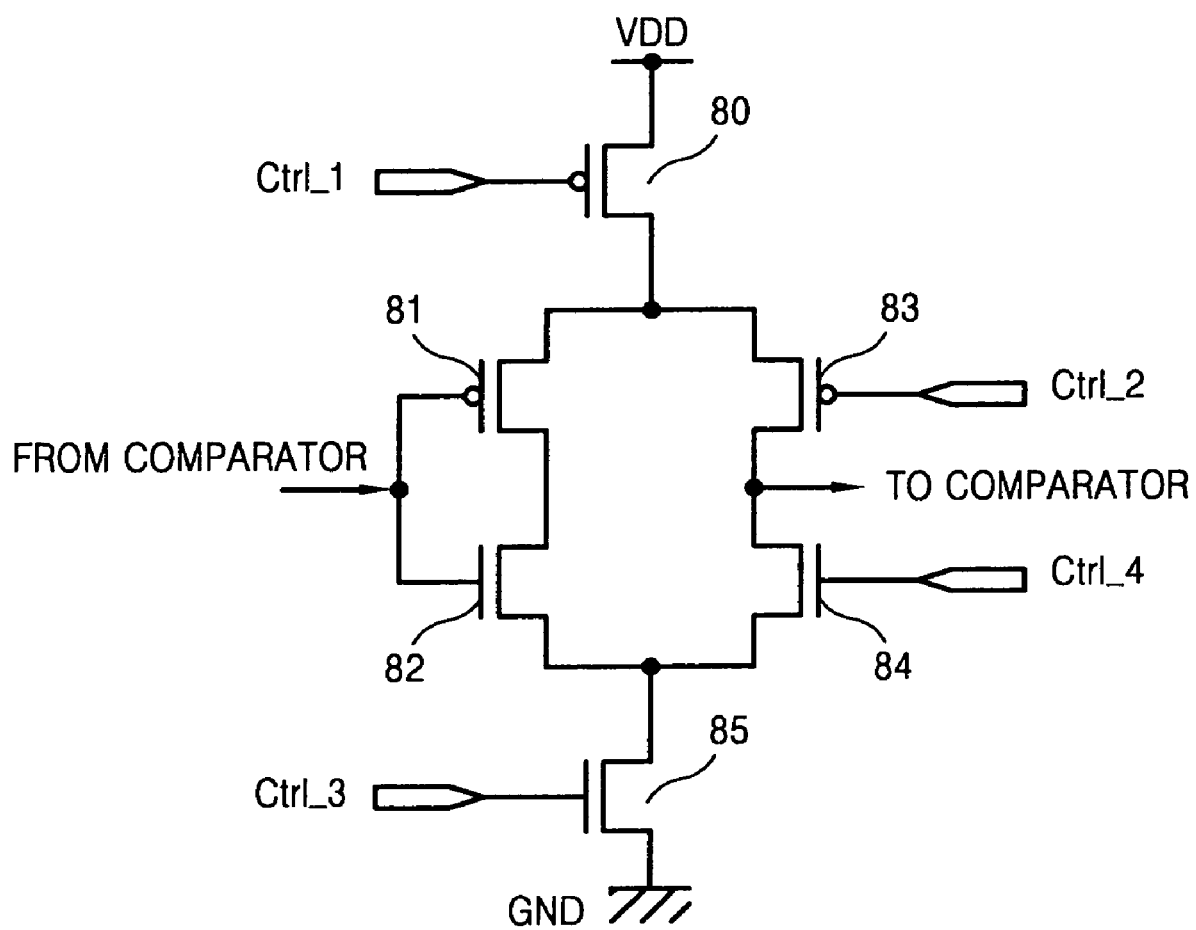
FIG. 8 is a circuit diagram of current sources including PMOS and NMOS transistors according to an embodiment of the present invention.

FIGS. 7 and 8 illustrate implementation of current sources for the controller 54 using PMOSFETs and NMOSFETs having a differential configuration, according to another embodiment of the present invention. Referring to FIG. 7, first and second PMOSFETs 71 and 72 have sources coupled together to a third PMOSFET 70 in a differential configuration. The PMOSFETs 70 and 71 are coupled in series between a high power voltage VDD and a low power voltage GND.

The gates of the PMOSFETs 70 and 72 are controlled by PMOSFET control signals Ctrl_1 and Ctrl_2, respectively. The gate of the PMOSFET 71 is controlled by the output of the comparator 53. The drain of the PMOSFET 72 is coupled to the controlled input of the comparator 53 for providing a charging current. Clock feed-through that may occur when the current source is shorted is suppressed so that an error that may additionally occur at the completion of correction is reduced in FIGS. 7 and 8.

When the output of the comparator 53 is "logic high", current is supplied to the PMOSFET 72 (instead of to the PMOSFET 71), for providing charging current to the controlled input of the comparator 53. When the output of the comparator 53 is "logic low", the current flows to the PMOSFET 71 (instead of to the PMOSFET 72) such that a discharging current is provided to the controlled input of the comparator 53 by the NMOSFETs 82, 84, and 85 of FIG. 8.

The NMOSFETs 82, 84, and 85 have the similar differential configuration as described for the PMOSFETs 80, 81, and 83. The charging current source including the PMOSFETs 80, 81, and 83 is configured in symmetry with the discharging current source including the NMOSFETs 82, 84, and 85. The gates of the NMOSFETs 84 and 85 are controlled by NMOSFET control signals Ctrl_4 and Ctrl_3, respectively. The gate of the NMOSFET 82 is controlled by the output of the comparator 53.

Figure 9:
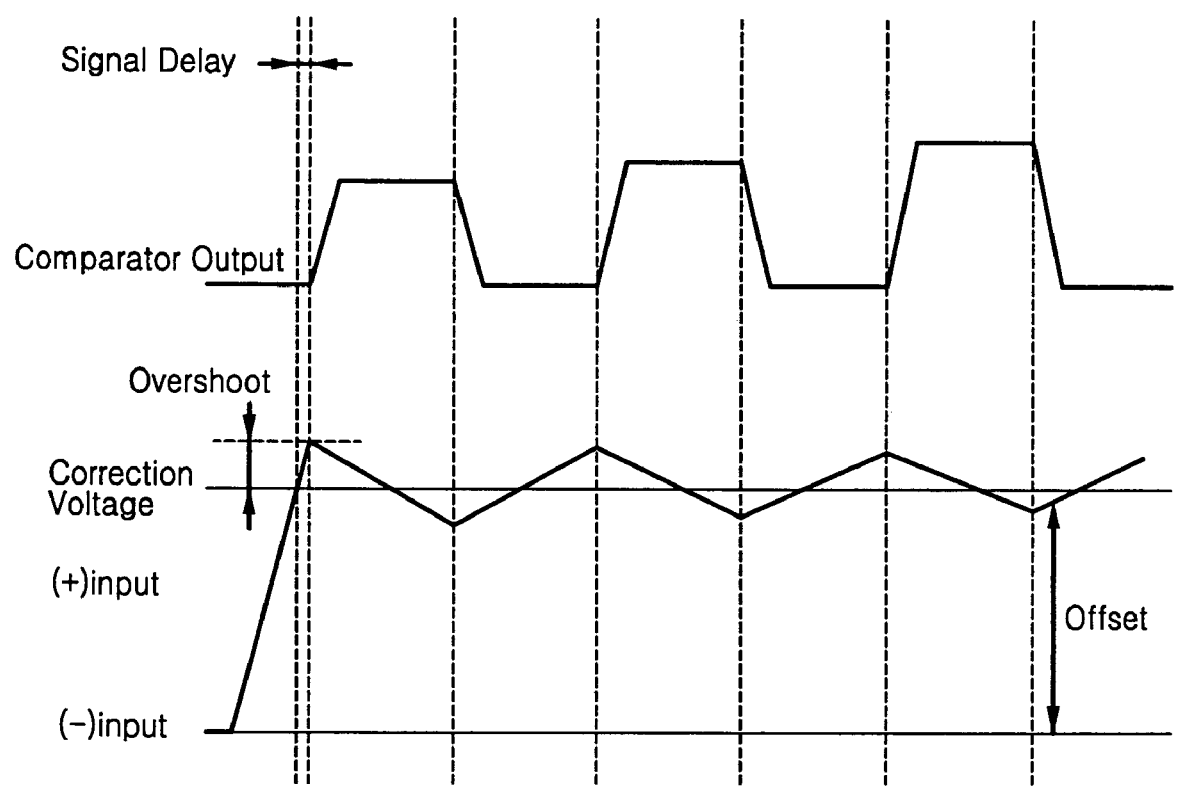
FIG. 9 is a timing chart of signals during operation of the CDS/ADC apparatus of FIG. 6, according to an embodiment of the present invention.

FIG. 9 is a timing chart of signals during operation of the CDS/ADC apparatus of FIG. 6. Referring to FIG. 9, since a comparator has a predetermined signal delay, current control for offset compensation starts a predetermined period of time after the comparator receives an input. As a result, an overshoot occurs for the voltage at the controlled input of the comparator. The correction voltage in FIG. 9 indicates the desired voltage at the controlled node.

Since the amount of the overshoot is proportional to the amount of charging and discharging current of the controller 64, such currents are desired to be small. On the other hand, with such smaller current, the time for offset correction may increase if the offset to be corrected is large. This problem may be solved by using a plurality of charging and discharging current sources.

Figure 10:
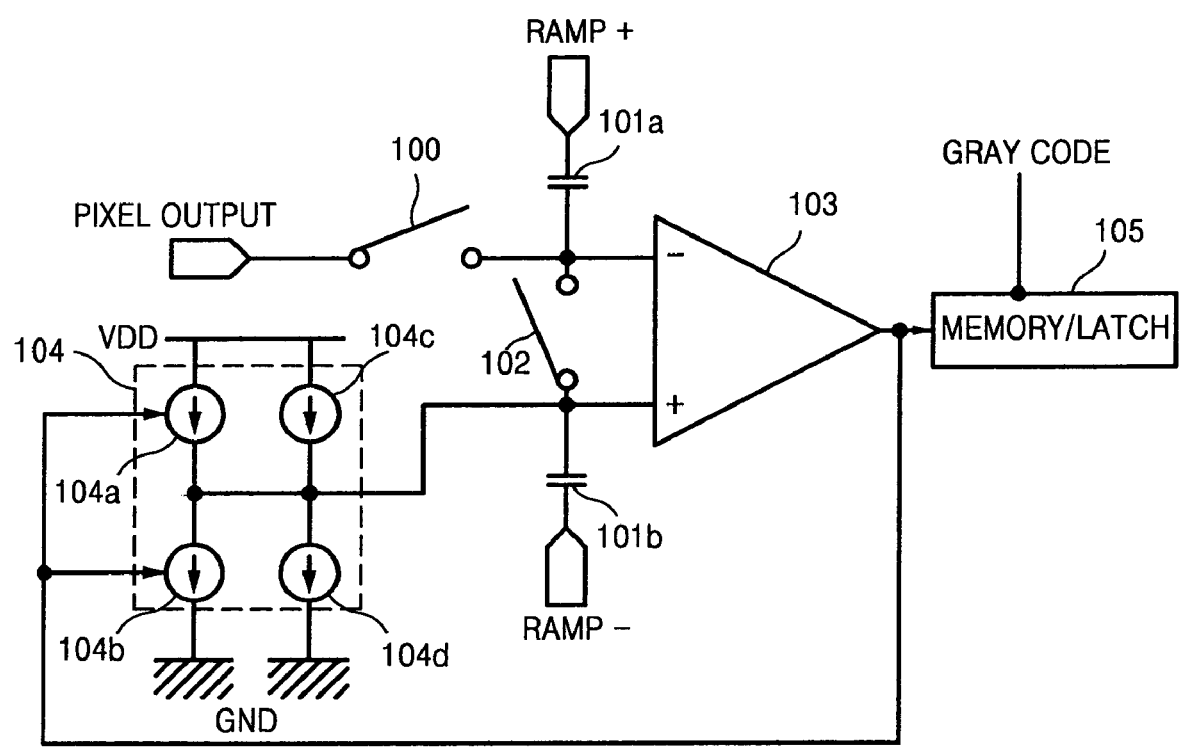
FIG. 10 illustrates a CDS/ADC apparatus of a CMOS image sensor according to yet another embodiment of the present invention.

FIG. 10 illustrates a CDS/ADC apparatus of a CMOS image sensor according to yet another embodiment of the present invention. Elements 100, 101a, 101b, 102, 103, and 105 in FIG. 10 operate similarly as elements 60, 61a, 61b, 62, 63, and 65, respectively, in FIG. 6 as already described.

However referring to FIG. 10, the controller 104 includes a plurality of charging current sources 104a and 104c and a plurality of discharging current sources 104b and 104d. In one embodiment of the present invention, the current sources 104a and 104b provide higher current levels than the current sources 104c and 104d, when activated.

Figure 11:
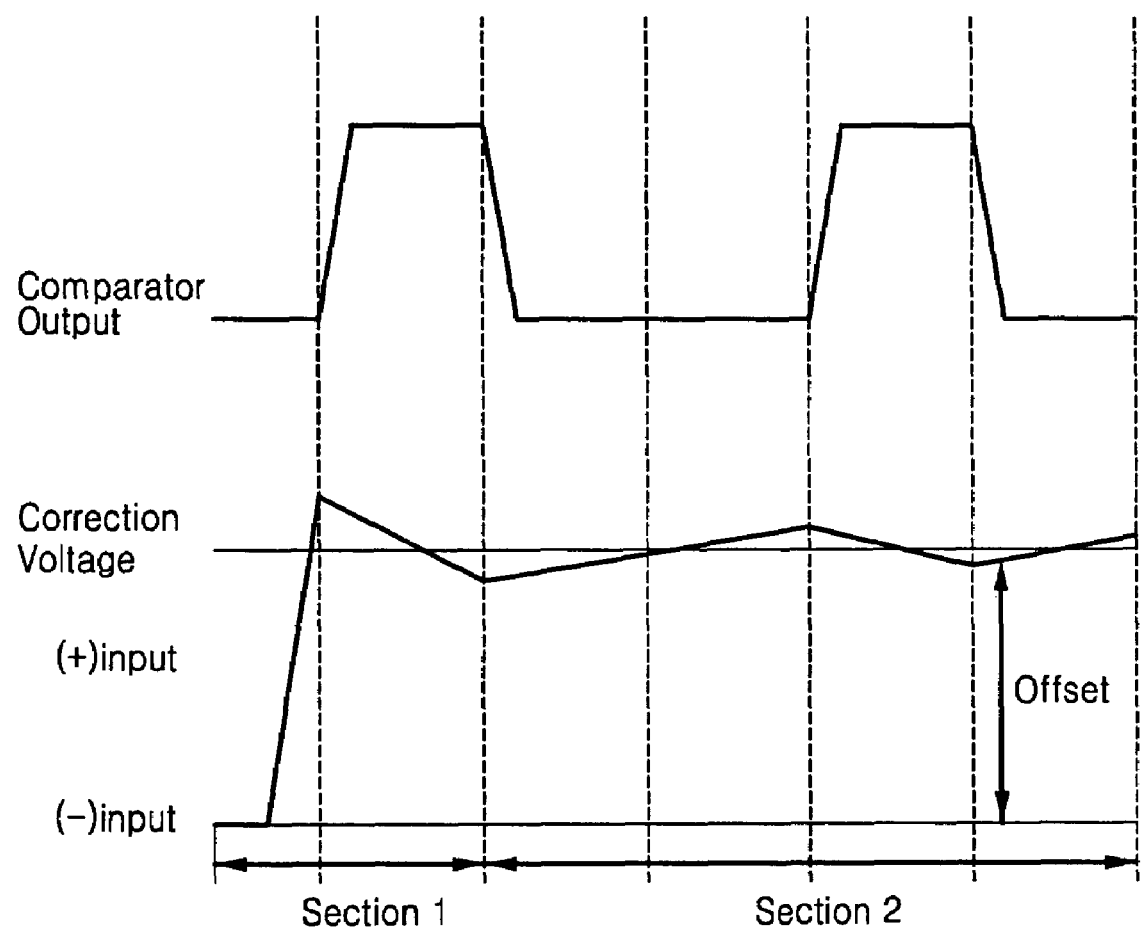
FIG. 11 is a timing chart of signals during operation of the CDS/ADC apparatus of FIG. 10 according to another embodiment of the present invention.

FIG. 11 is a timing chart of signals during operation of the CDS/ADC apparatus of FIG. 10. Referring to FIGS. 10 and 11, during "Section 1", all of the current sources 104a, 104b, 104c, and 104d are used to accomplish quick offset correction with a large amount of current. During "Section 2", only current sources 104c and 104d having the smaller amount of current are used to correct overshoot for reducing the offset overshoot. Thus, different sets of the charging current sources 104a and 104c and the discharging current sources 104b and 104d are turned on during different time periods in this embodiment of the present invention.

Alternatively, the charging current sources 104a and 104c each provide a same current level, and the discharging current sources 104b and 104d each provide a same current level, when turned on. In such a case also, all of the current sources 104a, 104b, 104c, and 104d are used to accomplish quick offset correction in "Section 1" while just the current sources 104c and 104d are to reduce offset overshoot in "Section 2". FIG. 10 shows two pairs of charging and discharging current sources, but three or more pairs of charging and discharging current sources may be used in the present invention.

Figure 12:
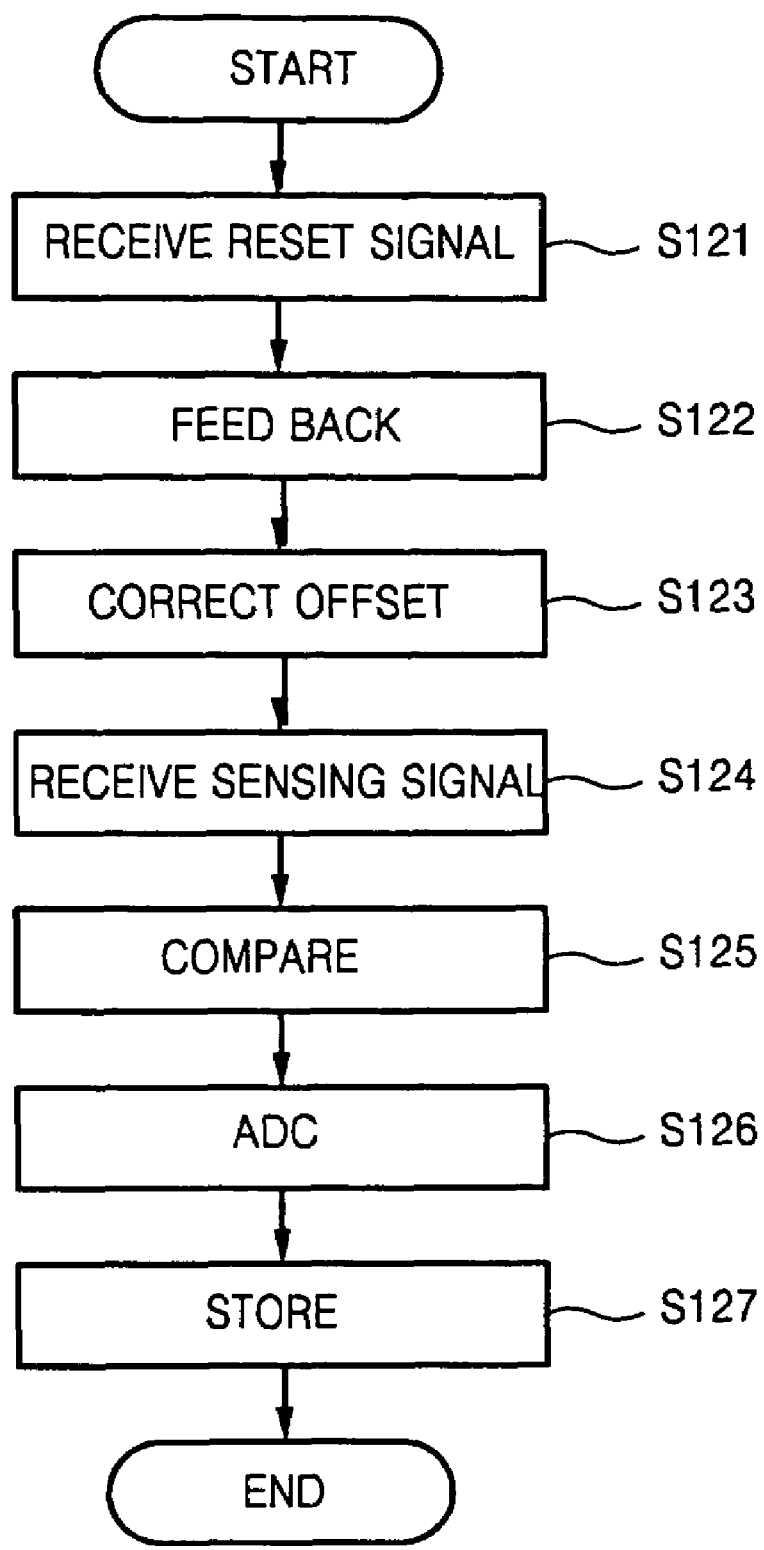
FIG. 12 is a flowchart of steps during operation of the CDS/ADC apparatuses in the above-illustrated embodiments of the present invention.

FIG. 12 is a flowchart of steps performed by embodiments of the CDS/ADC apparatus described above according to an embodiment of the present invention. In step S121, a rest voltage, (i.e., a reset signal) from a pixel is applied to the first and second capacitors coupled to the negative and positive inputs of the comparator. Thereafter, the comparator outputs a "logic high" or "logic low" value due to its own offset. In step S122, the output of the comparator is fed-back to the controller through a feedback loop.

In step S123, the fed-back output of the comparator controls the controller that adjusts a voltage at the controlled input of the comparator to correct the offset of the comparator. The controller adjusts such a voltage by using the charging and discharging currents as described in the embodiments herein.

In step S124, a sensing signal is applied and stored at the capacitor coupled to the other input of the comparator. In step S125, after the sensing signal and the reset signal with the offset correction are each respectively stored in the capacitors at the inputs of the comparator, ramp voltage RAMP+ and RAMP− are applied on the other end of such capacitors.

With such ramp signals being applied, the output of the comparator makes a logical transition at a time point depending on the difference between the sensing signal and the reset signal. The memory/latch unit receives the gray code that changes with time, and stores the gray code value at the time point when the output of the comparator makes the logical transition. Such a stored gray code represents the digital value for the difference between the sensing signal and the reset signal for the pixel (steps S126 and S127 of FIG. 12).

Such steps of the flow-chart of FIG. 12 are performed simultaneously by a plurality of CDS/ADC apparatuses for an activated row of pixels in the pixel array of the CMOS image sensor. Each CDS/ADC apparatus is coupled to a respective pixel in the row for performing CDS/ADC for that pixel.

In this manner, an additional comparator is not used for correcting the offset of the comparator performing CDS/ADC in the image sensor. Rather current sources comprised of transistors are used for correcting the offset of the comparator performing CDS in the image sensor from feed-back of the output of the comparator. Thus, the image sensor may be implemented with small area and low cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for correlated double sampling in an image sensor, comprising:
    a comparator for receiving and comparing a reset signal and a sensing signal from a pixel of the image sensor; and a controller for adjusting a voltage at a controlled input of the comparator to compensate for offset of the comparator from feed-back of an output of the comparator;
wherein the controller includes:
a first current source that is turned on for charging the controlled input of the comparator when the output of the comparator is at a first voltage; and
a second current source that is turned on for discharging the controlled input of the comparator when the output of the comparator is at a second voltage.

2. The apparatus of claim 1, wherein the first and second current sources are turned off or balanced when the output of the comparator is at an intermediate voltage between the first and second voltages.

3. The apparatus of claim 1, wherein the first current source is comprised of:
at least one PMOSFET (P-channel metal oxide semiconductor field effect transistor) coupled between a high power voltage and the controlled input, and being controlled with the output of the comparator and at least one PMOSFET control signal;
and wherein the second current source is comprised of at least one NMOSFET (N-channel metal oxide semiconductor field effect transistor) coupled between a low power voltage and the controlled input, and being controlled with the output of the comparator and at least one NMOSFET control signal.

4. The apparatus of claim 3, wherein the first current source is comprised of a plurality of PMOSFETs having a cascode configuration, and wherein the second current source is comprised of a plurality of NMOSFETs having a cascode configuration.

5. The apparatus of claim 3, wherein the first current source is comprised of a plurality of PMOSFETs having a differential configuration, and wherein the second current source is comprised of a plurality of NMOSFETs having a differential configuration.

6. The apparatus of claim 1, further comprising:
a first capacitor coupled to the controlled input of the comparator; and
a second capacitor coupled to another input of the comparator.

7. The apparatus of claim 6, wherein the controller adjusts the voltage at the controlled input to compensate the offset of the comparator after the reset signal is stored in the first and second capacitors.

8. The apparatus of claim 7, further comprising:
a switching network for switching the sensing signal to be stored in the second capacitor, after the voltage at the controlled input is adjusted to compensate for the offset of the comparator;
wherein a first ramp signal is applied to the first capacitor and a second ramp signal is applied to the second capacitor after the sensing signal is stored in the second capacitor; and
a data storage device for storing a bit code at a time point when the output of the comparator makes a logical transition as the first and second ramp signals are being applied.

9. The apparatus of claim 1, wherein the controller includes:
a plurality of first current sources that are turned on for charging the controlled input of the comparator when the output of the comparator is at a first voltage; and
a plurality of second current sources that are turned on for discharging the controlled input of the comparator when the output of the comparator is at a second voltage.

10. The apparatus of claim 9, wherein the first current sources provide different charging current levels, and wherein the second current sources provide different discharging current levels.

11. The apparatus of claim 10, wherein different subsets of the first current sources are turned on during different time periods, and wherein different subsets of the second current sources are turned on during different time periods.

12. The apparatus of claim 1, wherein the image sensor is a CMOS (complementary metal oxide semiconductor) image sensor.

13. A method of correlated double sampling in an image sensor, comprising:
comparing a reset signal and a sensing signal from a pixel of the image sensor, the reset and sensing signals being applied at inputs of a comparator;
adjusting a voltage at a controlled input of the comparator to compensate for offset of the comparator from feed-back of an output of the comparator;
turning on a first current source for charging the controlled input of the comparator when the output of the comparator is at a first voltage;
turning on a second current source for discharging the controlled input of the comparator when the output of the comparator is at a second voltage; and
turning off or balancing the first and second current sources when the output of the comparator is at an intermediate voltage between the first and second voltages.

14. The method of claim 13, further comprising:
storing the reset signal at a first capacitor coupled to the controlled input of the comparator and at a second capacitor coupled to another input of the comparator; and
adjusting the voltage at the controlled input to compensate the offset of the comparator after the reset signal is stored in each of the first and second capacitors.

15. The method of claim 14, further comprising:
storing the sensing signal in the second capacitor, after the voltage at the controlled input is adjusted to compensate for the offset of the comparator;
applying a first ramp signal to the first capacitor and a second ramp signal to the second capacitor after the sensing signal is stored in the second capacitor; and
storing a bit code at a time point when the output of the comparator makes a logical transition as the first and second ramp signals are being applied.

16. The method of claim 13, further comprising:
turning on a plurality of first current sources for charging the controlled input of the comparator when the output of the comparator is at a first voltage; and
turning on a plurality of second current sources for discharging the controlled input of the comparator when the output of the comparator is at a second voltage.

17. The method of claim 16, wherein the first current sources provide different charging current levels, and wherein the second current sources provide different discharging current levels.

18. The method of claim 16, further comprising:
turning on different subsets of the first current sources during different time periods; and
turning on different subsets of the second current sources during different time periods.

* * * * *